Nov. 11, 1952      G. E. CONOVER      2,617,304
PRESSURE MEASURING INSTRUMENT

Filed March 20, 1946      4 Sheets-Sheet 1

INVENTOR.
GEORGE E. CONOVER
BY
Sidney A. Johnson
ATTORNEY

Nov. 11, 1952 G. E. CONOVER 2,617,304
PRESSURE MEASURING INSTRUMENT
Filed March 20, 1946 4 Sheets-Sheet 3

INVENTOR.
GEORGE E. CONOVER
BY
Sidney A. Johnson
ATTORNEY

Nov. 11, 1952     G. E. CONOVER     2,617,304
PRESSURE MEASURING INSTRUMENT Filed March 20, 1946     4 Sheets-Sheet 4

INVENTOR.
GEORGE E. CONOVER
BY
Sidney A. Johnson

Patented Nov. 11, 1952

2,617,304

UNITED STATES PATENT OFFICE 2,617,304

PRESSURE MEASURING INSTRUMENT

George E. Conover, Garland, Tex., assignor, by mesne assignments, to Socony-Vacuum Oil Company, Incorporated, New York, N. Y., a corporation of New York Application March 20, 1946, Serial No. 655,660

19 Claims. (Cl. 73—384)

This invention relates to instruments for measuring changes in gas pressures, more particularly to a barometer for measuring changes in atmospheric pressure such as occur with change in the elevation of the barometer, and has for an object the provision of an instrument which is simple both in construction and operation, and yet has great sensitivity.

Heretofore, many schemes have been proposed for the measurement of atmospheric pressure, including mercury and aneroid barometers, and it has been proposed to utilize the expansion and contraction of air, or a selected gas to indicate a change in atmospheric pressure. Systems and instruments of the foregoing types are either limited in their sensitivity or they are affected by the ambient temperature to a degree which greatly impairs their accuracy and usefulness.

In carrying out the present invention in one form thereof, there is provided an instrument which operates on the null principle, which has a sensitivity great enough to detect, in response to the resultant change in air pressure, a change in elevation of the instrument of one foot or less. In accordance with the invention, two chambers are connected by a length of capillary tubing. One chamber is sealed at the time of calibration of the instrument, while the other chamber is exposed to the atmosphere. The volume of the sealed chamber is then changed until the pressure therein is exactly equal to the pressure of the unsealed chamber. The position of a drop of liquid within the capillary tubing is utilized to indicate when an exact pressure-balance has been achieved. The volume-changing means is calibrated and thus the change in pressure may be determined directly from the movement required of the volume-changing device to produce the pressure-balance.

For a more detailed explanation of the invention, and for further objects and advantages thereof, reference is to be had to the following detailed description taken in conjunction with the accompanying drawings, in which:

Fig. 2-A is an enlarged view of the lower end of the volume-changing device;

Referring to the drawings, the invention will first be explained in connection with the diagrammatic illustration, Fig. 8, of one embodiment thereof. There will then be described the constructional details, Figs. 1—7, of a preferred form of the invention.

Figure 8:
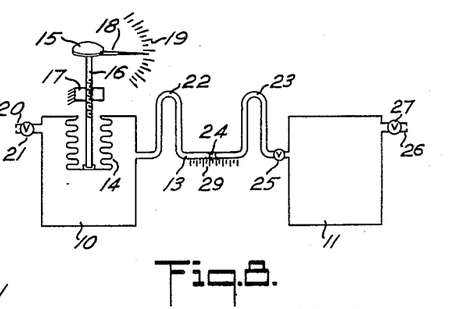
Fig. 8 diagrammatically illustrates another form of the invention.

Referring now to Fig. 8, the invention has been illustrated as comprising a normally sealed chamber 10 and a normally unsealed chamber 11 connected by a length of glass or transparent capillary tubing 13. The volume of chamber 10 may be varied by means of a flexible bellows 14. The bellows is expanded or contracted by rotating a knob 15 which drives a shaft 16. This shaft threadedly engages a stationary support 17 so that as the shaft is rotated in one direction or the other it expands or contracts the bellows 14. An indicator or pointer 18 is connected to the knob 15 and cooperates with an associated scale 19. The chamber 10 may be opened to the atmosphere through a tube 20 under the control of a valve 21.

The capillary tubing 13 includes two inverted U-shaped sections 22 and 23, respectively forming traps for a small quantity of liquid 24 which is placed in the horizontal section of the tubing located between the liquid-traps 22 and 23. A clamp valve 25 is disposed between the liquid-trap 23 and the normally unsealed chamber 11. The valve 25 is normally open. The normally unsealed chamber 11 is connected by a capillary tube 26 to the atmosphere under the control of a valve 27.

In calibrating the instrument, that is, fixing the zero reading thereof for a given elevation, the valves 25 and 27 are opened. The valve 21 is then opened to connect the normally sealed chamber 10 to the atmosphere. The knob 15 is then rotated to move the pointer 18 to a reference point on the scale 19. Any selected point on the scale may be utilized as the reference point. The valve 21 is then closed and the position relative to the associated scale 29 of the liquid 24 is carefully determined. The small quantity of liquid 24, as it appears through the transparent tubing, looks like a bubble and will hereafter be so named. The liquid or bubble 24 is preferably a low-gravity oil, such as butyl phthalate, with a high temperature of vaporization. It forms a movable air seal between the two chambers 10 and 11.

After the zero or reference position of the bubble 24 has been determined, the valve 25 and/or the valve 27 are closed. The entire apparatus may then be carried to a new location. The new location will be assumed to have an elevation differing from that of the previous location. Therefore, the atmospheric pressure at the new location will differ from that of the previous location. The clamp valve 25, if closed, is then opened. The bubble 24 will not move because the valve 27 will still be closed. The valve 27 is then momentarily opened to connect the chamber 11 to atmosphere. There will be ingress or egress of air to the chamber 11 with a resultant change in pressure therein. This change in pressure will cause the bubble 24 to move in the direction of the chamber having the lower pressure. The shaft 16 is then rotated by the knob 15 to bring the bubble back to the original zero or reference position. The valve 27 is repeatedly opened and the shaft 16 is rotated until the bubble 24 comes to rest. In this manner, the actual movement of the bubble 24 may be small and kept within the view of an optical magnifier. When the bubble 24 is approximately at rest, the valve 27 is left in the open position. If desired, the valve 27 may be initially moved to and kept in its open position, it being understood that the horizontal tubing 13 may be made relatively long to take care of maximum movement of the bubble 24, which movement will of course be restricted as the knob 15 is rotated to produce a balancing pressure in the chamber 10. The size of the capillary tube 26 is preferably selected so that pressure changes in the chamber 11 occur at a relatively low rate. The capillary tube 26, which may also take the form of other flow-restricting means, together with the chamber 11 filters or smooths out transient pressure changes due to local conditions.

When exact pressure-balance has been attained, the bubble 24 will have been returned to its reference position. The degree of rotation of the pointer 18 required to return it to that position will then be directly related to the extent of the pressure change which occurred in the chamber 10. Accordingly, the scale 19 may be calibrated directly in terms of pressure, or, for conditions of constant atmospheric temperature, in terms of elevation. By making the cross-sectional area of the opening through the capillary tube 13 small as compared with the volume of the chamber 10, very high sensitivity can be obtained. This follows because the bubble 24 must be moved a relatively great distance before the resultant change in volume will produce a substantial change in the pressure in the chamber 10. That volume change will depend upon the area of the opening in the tube 13 times the distance moved by the bubble 24. Since the ratio of the cross-sectional area of chamber 10 to that of tube 13 is large, the sensitivity is also of a high order. The tubing 13, being horizontal, eliminates the effect of gravity; and the liquid bubble 24, being capable of wetting the tube 13, minimizes resistance to movement thereof. In one embodiment of the invention, the change in atmospheric pressure due to a change in one foot of elevation of the instrument caused the bubble 24 to move a distance of three millimeters. This change corresponds with a change in atmospheric pressure of one part in thirty thousand.

By providing a very small capillary tube 26 or a pin-hole orifice, in place of or in addition to the valve 27, rapid variations in atmospheric pressure may be eliminated. Thus, the pin-hole opening or capillary tubing 26 and the chamber 11 serve as a filter which eliminates high-frequency components of pressure such as arise due to small gusts of wind and the like.

The instrument may also be used for measurement of gas pressures other than changes in the atmospheric pressure. The chamber 11 may itself contain the gas whose pressure is to be measured. The chamber 11 may be normally sealed or it may be connected through the capillary tubing 26 to a separate container. In all modifications of the invention, the null type method of measuring is preferred; that is, the adjustment of the pressure within the container 10 to equal that of the unknown pressure. For relatively large changes in pressure, the bubble or movable liquid seal 24 may tend to move upwardly into one or the other of the liquid traps 22 and 23. Should it do so, the force of gravity must then be overcome, whereas it is not present as long as the bubble is disposed in the horizontal length of tubing 13. The traps 22 and 23 are also high enough to prevent loss of the bubble 24 by movement of the bubble 24 into one or the other of chambers 10 and 11. Where relatively great pressure changes are suspected to exist, the intermittent opening of the valve 27 will permit not only the observation of the direction of movement of the bubble 24 but also will show the direction of rapid rotation of the knob 15 to change the pressure of chamber 10 until it approaches that of the chamber 11.

In the preferred form of the invention, as illustrated in Figs. 1–7, the normally sealed chamber 10 is disposed within the outer and normally unsealed chamber 11. An upper plate or closure member 30, common to both chambers, serves to seal the side walls 31 and 32 thereof. The bottom wall 33 of the outer chamber 11 is suitably secured, as by soldering, to the side wall 32. The bottom wall 34, similarly secured to the side wall 31, is provided with a recess 35 to receive a cup 36 provided with a flange 37, Fig. 2-A, to which there is secured the lower end of the expansible bellows 14. The upper end of the bellows 14 is secured to the flange 38 of a tubular member 39, the lower end of which is threaded to receive the threaded end of the drive shaft 16. The flange 38 is bolted or otherwise secured to the upper plate 30. An unthreaded lower end-portion of the shaft 16 is journaled in a ball bearing, Fig. 2-A, the outer race 40 of which is pressed into the cup 36, while the inner race is pressed onto the lower end-portion of the shaft 16. A nut 41 threaded on the lower end of the shaft 16 presses against the inner race 42. Thus, as the shaft 16 is rotated in one direction or the other, it moves the cup 36 to shorten or lengthen the bellows 14 and thus increases or decreases the volume of the chamber 10.

Figures 1, 2:
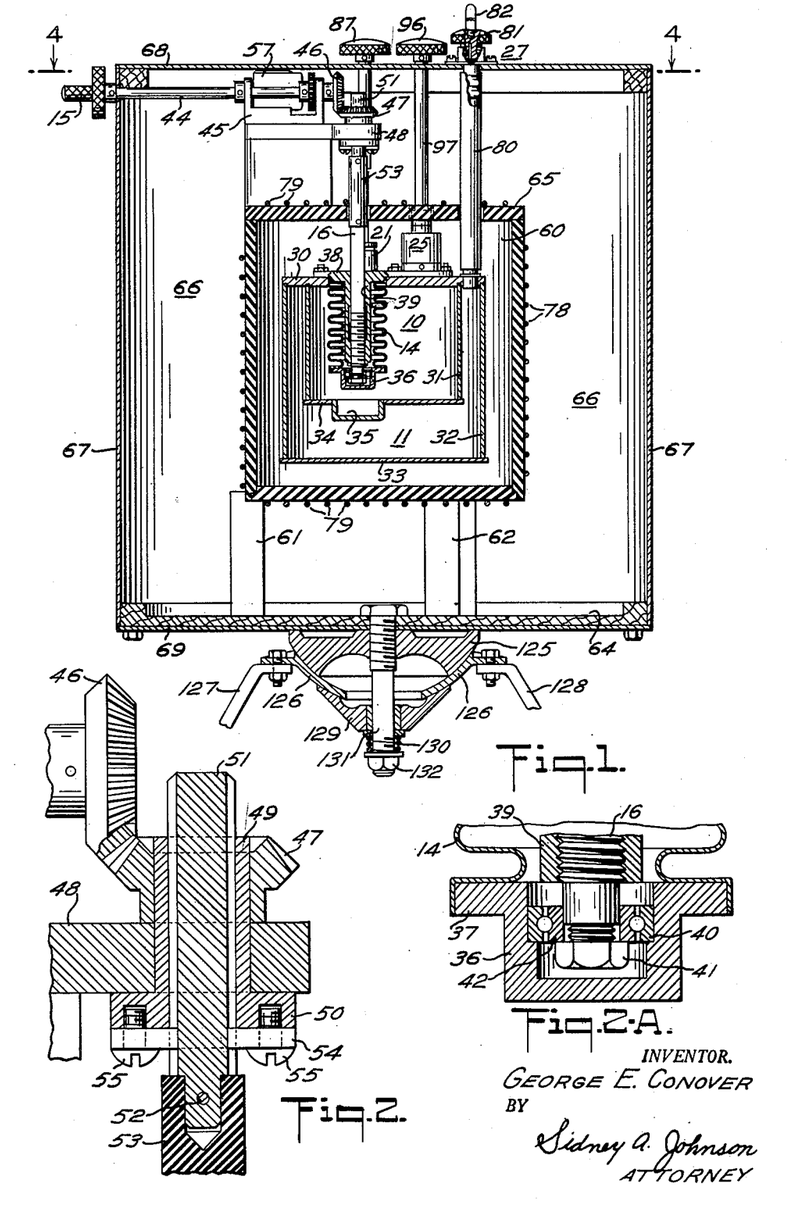
Fig. 1 is a sectional view taken on the line 1—1 of Fig. 3 of an instrument embodying the invention.
Fig. 2 is an enlarged sectional view of the gearing associated with the volume-changing means.
Figure 3:
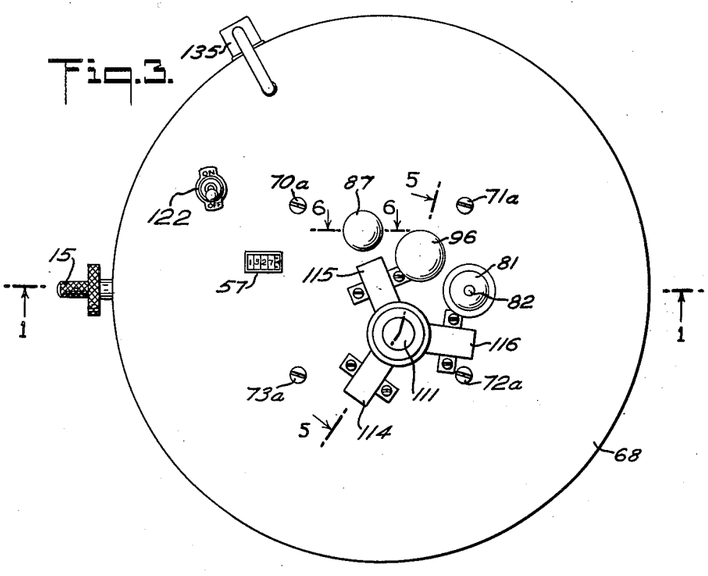
Fig. 3 is a plan view of the instrument of Fig. 1.

The shaft 16 is rotated by means of the knob 15 which, in this embodiment of the invention, is secured to one end of a shaft 44 which is itself supported in a bearing bracket 45. On the other end of the shaft 44 there is provided a bevel gear 46 which meshes with a second bevel gear 47, journaled within a supporting member 48. As shown in Fig. 2, the gear 47 is pressed onto a bushing 49 having a flange 50 disposed below the supporting member 48. The inner diameter of the bushing 49 is large enough to provide clearance around a splined stub shaft 51, the lower end of which is connected by a pin 52 to a coupling member 53, of heat-insulating material. The lower end of the coupling member 53 is connected to the drive shaft 16, Fig. 1. The stub shaft 51 is driven by rotation of the gear 47 and the bushing 49 by means of a driving plate 54, secured as by screws 55, to the flange 50. The driving plate 54 has an inner opening provided with recesses and extensions complementary to the splines of the stub shaft 51. By utilizing the driving plate 54, there is minimized the friction which would otherwise exist between the driving and drven parts of the spline connection. Accordingly, upon rotation of the knob 15, the shaft 16 is rotated and, with a minimum of friction due to the spline connection, the bellows 14 is expanded or contracted to any desired position.

The position of the bellows 14 may be determined by any suitable means. For example, a counter 57 may be driven by the shaft through the gears 58 and 59, Fig. 4. The counter itself is preferably responsive to fractional revolutions as well as to full revolutions of the shaft. In one form of the invention, the right-hand numeral-disc was marked with lines to indicate each hundredth of a revolution while the discs to the left registered up to 9999 revolutions of the shaft 44. As will be later explained, the counter 57 may also be utilized for easy determination of the elevation of the barometer.

The chambers 10 and 11 are disposed within an outer chamber 60 formed by walls 65 of heat-distributing material. The bottom of this outer casing rests upon three posts 61, 62, and 63, Figs. 1 and 4, the lower ends of which are secured to a baseboard 64. The heat-distributing walls 65 of chamber 60 are enclosed in a still larger heat-insulating chamber 66 formed by the annular side wall 67 and the upper and lower closure members 68 and 69. Supporting posts or rods 70—73, Fig. 4, extend from the upper wall 65 of the chamber 60 to the upper plate or closure member 68. These rods are hidden behind certain of the parts in Fig. 1. The rod 72 is visible in Fig. 5. They are fastened to the upper plate 68 by means of screws 70a—73a. There are four posts of insulating material respectively secured to the closure plate 30 and to the closure 65 by any suitable means such as screws. Two of the posts, the posts 76 and 77, may be seen in Fig. 5. The ends of these posts, the posts 76 and 77, are shown in the fractional sectional view of Fig. 4, and the screws 76a which threadedly engage the other two posts are also shown extending through the upper plate or closure member 65.

In order to maintain the chambers 10 and 11 at a fixed and predetermined temperature, the outer chamber 60 is heated to and maintained at a predetermined temperature, preferably higher than that of the atmosphere; for example, at 150° F., by means of electrical resistors or heaters 78 and 79 supported on the heat-distributing walls of the chamber 60. A conventional control system, forming no part of the present invention, is utilized to maintain constant the aforesaid temperature.

It is to be observed, Fig. 1, that the outer chamber 11 is connected by rubber tubing 80 to the valve 27 mounted on the upper plate 68. The valve 27 includes a knurled cap 81 and an additional element 82. Upon movement of the cap 81, a relatively large opening connects the tubing 80 to the atmosphere, while rotation of the element 82 opens a small pin-hole. The inner chamber 10 may be opened to the atmosphere under control of the valve 21, a detailed view of which appears in Fig. 6. This valve is threaded into a bushing 83 suitably secured in the closure member 30, as by brazing or soldering. The valve stem 84 may be rotated to open and close the valve by means of a heat-insulated rod 85 secured by the pin 86 to the stem 84. The rod 85 extends above the upper plate 68 and has secured to it an operating knob 87. The clamp valve 25, a detailed view of which appears in Fig. 7, may be closed to prevent change in the pressure in the chamber 11 from affecting the bubble 24 located in the horizontal length 89 of the capillary tubing. The fluid circuit, Fig. 5, may be traced from the outer chamber 11 by way of capillary tubing 90 which extends from an opening in the closure 30 to one side of the valve 25. From the other side of the valve, two sections 91 and 92 of capillary tubing connected together by a short length of rubber tubing 93 form the inverted U-shaped liquid-trap 23. Similar lengths of tubing interconnected by rubber tubing 94 form the other inverted U-shaped liquid-trap 22, which by tubing 95 completes the connection through an opening in the closure plate 30 to the inner chamber 10.

The valve 25 is operated by means of a knob 96, Fig. 1, located above the plate 68, and connected to a heat-insulated rod 97 which is itself connected by a pin 98 to a rotatable element 99. This rotatable element is secured by a pin 100 to a collar 101. The lower end of element 99 is threaded to receive a threaded cup 102 having a flange to which a sealing bellows 103 is attached. The cup 102 also has a projecting end 104 for closing the opening leading to the capillary tubing 91. The upper end of the bellows 103 is secured to the upper end of the valve housing 105. It is to be observed that the coupling elements or rods 53, 76, 77, 85, and 97 are all formed of heat-insulating material, such as that available on the market under the trade names "Micarta" or "Bakelite," and that rubber tubing is utilized to connect the outer chamber 11 to the atmosphere. By using these heat-insulating materials, there is minimized transference of heat to and from the chamber 60.

Again referring to Fig. 5, the bubble of liquid 24 preferably comprises a small quantity of low density liquid. This liquid may be a low density, non-volatile oil, such as butyl phthalate. It is free to move along the horizontal tubing 89 in response to any difference between the pressures existing in the chambers 10 and 11. If the pressure in the outer chamber rises, the drop of oil, the liquid seal 24, will move to the right, as viewed in Fig. 5, until the pressure in the chamber 10 equals that then existing in the chamber 11. It will now be apparent that the relative size of the capillary tubing 89 and the size, particularly volume, of the inner chamber 10 will determine the sensitivity of the system. If the tubing 89 has a very small inner diameter (of from one to two millimeters is preferred), the bubble 24 will be moved an increasingly greater distance than it would be for a larger diameter tubing in order to produce the same volume-displacement of air. Thus, the arrangement provides an extremely sensitive means for determining when the pressures in the inner and outer chambers 10 and 11 are equal. For small changes in pressure, a scale 29, Fig. 8, may be associated with tubing 89 and the position of the bubble noted with respect thereto, the principal use of the scale, however, being to establish its zero or reference position.

In the preferred form of the invention, a viewing tube 110 formed of a phenol condensation product sold under the trade names of "Bakelite" or "Micarta," or other heat-insulating material may be used, extends upwardly through upper wall 65 of the chamber 60 and through upper wall or plate 68 of chamber 66. The viewing tube 110 is provided with an eye-piece 111 at its upper end and with a magnifying lens 112 at the lower end adjacent the tubing 89. Illumination of the bubble 24 is provided by three lamps, energized under the control of a switch 122, Fig. 3, and respectively disposed in housings 114, 115, and 116, Fig. 3, one of which, the housing 114, is shown in detail in Fig. 5. A lamp or light bulb 114a is mounted in a socket or receptacle 117. The end of the bulb 114a projects outwardly into the viewing tube or housing 110. In order to minimize flow of heat toward or away from the chambers 10 and 11 from the lamps, a transparent window 118 is provided just below the lamp housings. An inner viewing tube 119 extends from the eye-piece 111 to a point just above the window 118. This inner tube 119 is made of copper or other material of high thermal conductivity and has a flange 121 painted white on the side adjacent the bulb 114a. The outside surface of the inner tube 119 below the flange 121 as well as the inside surface of tube 110 are painted white to increase illumination of bubble 24 by the bulbs or lamps. A plurality of openings 120 are provided in the upper end of the outer tube 110 to permit circulation of air and removal of heat from the inner tube 119.

With the foregoing explanations of two forms of the invention and the organization of the parts with respect to each other, it is to be understood that many variations may be made in many of the details without departing from the invention. The operation of the embodiment of Figs. 1–7 is quite similar to that of Fig. 8. In one application of the invention, a device such as shown in Figs. 1–7, was utilized to determine the elevations of a plurality of points. Though the counter 57 could be calibrated in terms of feet, for maximum accuracy account must be taken of the variation in the density of the air or atmosphere with temperature. Therefore, the counter 57 has a plurality of digit wheels by means of which the revolutions of the knob 15, and fractions thereof, from one setting to the next, may be accurately determined. Corrections for density are then applied to such readings, as will be later explained.

As already mentioned, the instrument is first located at a reference point, preferably of known elevation. At that point, the instrument is carefully adjusted so that the tubular section 89 will be disposed in a horizontal position. This adjustment may be readily made by reason of a ball and socket mounting of the instrument as a whole. As shown in Fig. 1, the baseboard 64 and the bottom plate 69 of the outer housing is clamped to a member 125 having a spherical surface cooperating with a complementary spherical surface formed on an intermediate member 126 carried by supporting legs, two of which, the legs 127 and 128, are shown in Fig. 1. A lower clamping member 129, also having a complementary spherical surface, is pressed by a spring 130 against the intermediate plate 126. A single bolt 131 provided with a nut 132 maintains the assembly in the illustrated position. To level the instrument, it is only necessary to grasp the outer housing and move it until it is level. The ball and socket mounting permits movement in any direction and provides for ready leveling of the instrument.

When the instrument is so leveled, the heating resistors 78 and 79, under the control of a suitable regulating system, serve to produce the predetermined temperature for the chambers 10 and 11. When sufficient time has elapsed for the temperature to be equalized throughout the various parts of the instrument, it may be calibrated in terms of the reference point. Accordingly, the valve 21 is opened by rotating the knob 87. It will be assumed that the other valves 27 and 25 are in their closed positions. The opening of the valve 21 connects the inner chamber 10 to atmosphere, through an internal bore provided in the valve stem 84 and which terminates at the respective openings 136 and 137. Since the chamber 66 is not sealed, atmospheric pressure exists therein.

The valve 27 is then opened by means of the element 82 for connecting the outside chamber 11 with the atmosphere. The valve 25 is then opened. After a short interval of time, depending upon the size of the pin-hole, the pressure in the chamber 11 will be equal to that in the chamber 10. The knob 15 is rotated to a predetermined counter-value and the valve 21 is then closed. The bubble 24 has been maintained directly beneath the viewing tube 110 during the entire process. When it is in the predetermined position thereunder, as determined with reference to the associated scale 29, a reading is taken on the counter 57. If the absolute elevation, that above sea level, is known, that setting will correspond therewith and the elevations of subsequent points or stations may be readily determined from the new setting of the counter 57. In ordinary practice, the elevation above sea level will be known at certain reference points located in the region under survey, and at the subsequent observation stations it will only be necessary to add or subtract the difference in the reading of the counter from that obtained at the reference point or station, and to multiply by the appropriate instrument constant determined from a calibration curve or from correction tables to translate the difference in the readings of the counter to a difference in the elevation in feet between the two observation points. After calibration, as aforesaid, the valve 27 is closed and the instrument is moved to a new station for determination of the elevation thereof.

At the new station, the instrument is again leveled, with clamp valve 25 open. While the bubble 24 is under observation, the valve element 82 is opened for an instant. The resultant change in pressure is reflected by movement of the bubble 24 in one direction or the other. The knob 15 is then rotated in a direction to produce movement of the bubble 24 in the opposite direction. The element 82 is moved to open the pin-hole and the knob 15 is rotated to hold the bubble 24 within the field of vision below the eye-piece 111. After the pressure in chamber 11 is equal to that of the atmospheric pressure, and the bubble 24 has been returned to its original position, a reading may be taken on the counter 57. This will show the change in elevation as between the new station and that of the reference station.

It is well known that atmospheric pressure varies with altitude, temperature, and humidity. Before correcting for the effects of temperature and humidity, the readings of the counter 57 are in more or less arbitrary units. Of course, each instrument could be so constructed that the scales of the counter would directly yield differences in elevation in feet, but the cost would be prohibitive. As is the usual custom in instruments of this general character, it is more satisfactory to use the instrument constant to convert the readings to the desired units.

An equation showing the difference in elevation between two stations is as follows:

$$\Delta H = \frac{1,600,000}{30.5} \times \frac{k \Delta N}{2P}(1+.004t)$$

Where:

$\Delta H$ is the difference in elevation between two stations $k$ is a constant for converting the difference between the counter readings to pressure $\Delta N$ is the difference between the counter readings at two stations ($k\Delta N = \Delta P$, the difference in pressure between said stations)

$P$ is the atmospheric pressure $H$ is the elevation in feet $t$ is the atmospheric temperature in degrees centigrade From the foregoing, it will be seen that the instrument constant is:

$$\text{Instrument constant} = \frac{1.6 \times 10^6}{61P}(1+.004t)k$$

From the foregoing, the necessary corrections may be readily made to the instrument readings. If further refinements are desired, corrections may also be made for the effect of humidity on atmospheric pressure.

Figure 9:
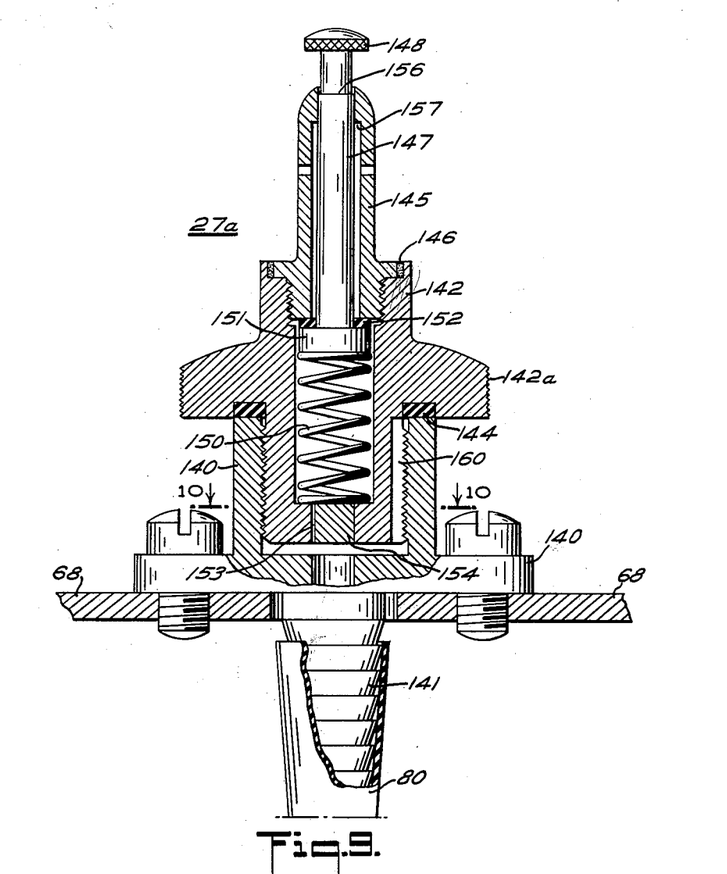
Fig. 9 is an enlarged sectional elevation of a preferred form of valve.
Figure 10:
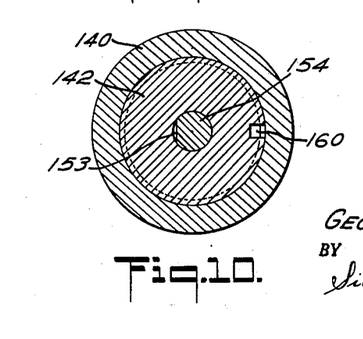
Fig. 10 is a sectional view taken on the line 10—10 of Fig. 9.

It will be remembered the valve 27 is opened by turning the valve element 82. To provide for rapid opening and closing of the line 80, a valve 27a of the type shown in Figs. 9 and 10 will be preferred. The valve 27a, Fig. 9, is fastened to the plate 68 and comprises a flanged member 140 from which extends a suitable member 141 for connection with the tubing 80. The valve body 142 threadedly engages the flanged member 140 and forms therewith a seal 144, suitable sealing material being provided for that purpose. A valve pin guide 145 threadedly engages the valve body 142 and a permanent seal 146 may be made, as by soldering. A valve pin 147 is provided on top with a knurled cap 148 which may be pressed or threaded thereto. A compression spring 150 bears against an enlarged end 151 of valve pin 147 and provides a sufficient force to form a seal 152. An orifice 153, Fig. 10, is constructed by drilling a small hole and using a plug 154 which is provided with a flat surface. This feature permits the construction, between the valve body 142 and the flat side of plug 154, of an orifice in which the air passage can be reduced to almost zero. In addition, the plug 154 and the associated hole in valve body 142 can be made long, which further reduces the amount of air that can pass through the orifice. Several orifices of different size may be provided for flexibility. For example, there may be used an orifice, which in connection with chamber 11 will have a time constant of the order of minutes. An orifice with a still longer time constant will be preferred for use on gusty days; orifices with shorter time constants will be preferred for quiet days.

Figure 4:
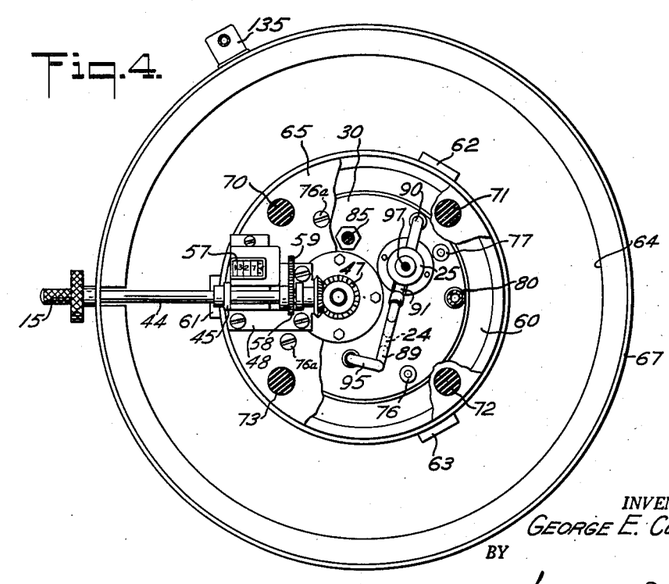
Fig. 4 is a sectional view taken on the line 4—4 of Fig. 1, with certain parts omitted.
Figure 5:
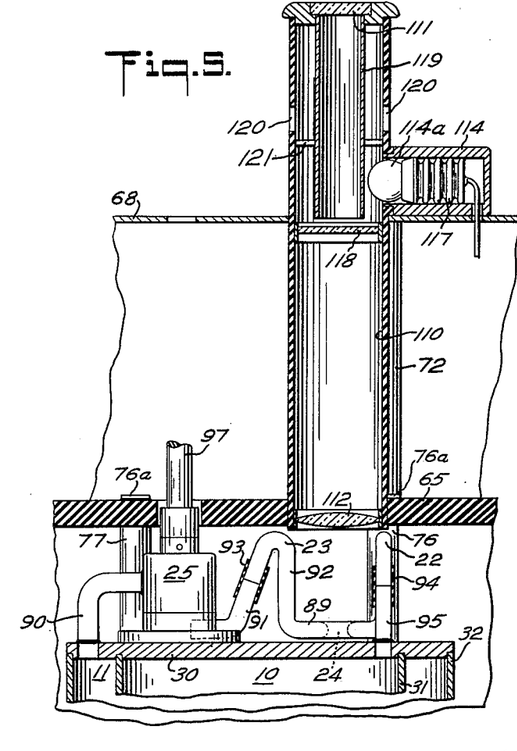
Fig. 5 is a sectional view taken on the line 5—5 of Fig. 3.
Figure 6:
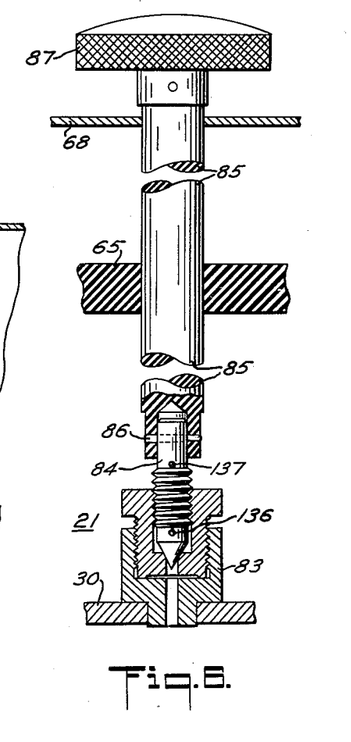
Fig. 6 is a sectional view taken on the line 6—6 of Fig. 3.
Figure 7:
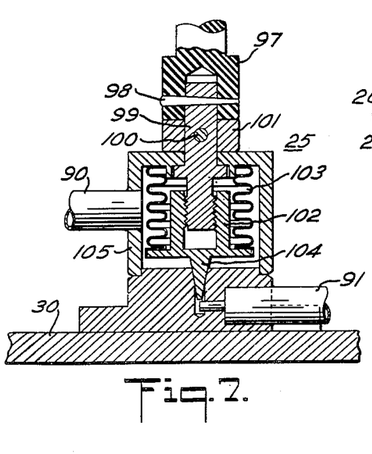
Fig. 7 is an enlarged sectional view of the valve shown in Fig. 5, located between the normally sealed and the normally unsealed chambers.

In operation of the instrument, and upon arrival at a new station where the atmospheric pressure most likely differs from the last station, valve 27a is operated by tapping valve pin cap 148. This permits a small amount of air to pass through the orifice 153, which in turn moves bubble 24. The knob 15, Figs. 1, 4, and 8, is rotated, preferably at the same time, to keep the bubble 24 approximately in the center or in midposition of the capillary tube 89. When the pressure difference becomes small, the valve pin 147 is pushed down and sidewise to a position where a shoulder 156 on valve pin 147 is held by spring 150 against a shoulder 157 of valve pin guide 145. This permits the valve to remain open until a final reading is made. To close the valve 27a, valve pin 147 is moved to line up concentric with the hole in the valve pin guide 145, which permits the spring 150 to force enlarged head 151 of the valve pin up against the seal 152.

If it is desired to by-pass the seal 152 and the orifice 153, the seal 144 may be broken by unscrewing valve body 142. A knurled flange 142a is provided to facilitate this operation. By breaking the seal 144 in this manner, air is permitted to move directly through slot 160, through the hole in coupling member 141 and thus through the tubing 80 to or from the instrument.

While the foregoing structure is preferred, a sensitive needle valve above the orifice 153 may be provided in lieu thereof.

While preferred embodiments of the invention have been described, it will be understood that further modifications may be made within the spirit and scope of the invention as set forth in the appended claims.

What is claimed is:

1. A barometer for measuring changes in atmospheric pressure comprising a normally sealed chamber, a flow channel open at one end to atmosphere and connected to said chamber at its opposite end, a small quantity of liquid disposed in said channel to form a movable air seal therefor and movable along said channel in response to pressure changes on either side thereof, means for indicating the location of said seal in said channel, and volume-changing structure for varying the pressure within said chamber until it is equal to the atmospheric pressure on the opposite side of said air seal.

2. A barometer for measuring changes in atmospheric pressure comprising a normally sealed chamber, a horizontal and transparent flow passage open at one end to atmosphere and connected to said chamber at its opposite end, a small quantity of a non-volatile liquid disposed in said passage to form a movable air seal therefor and movable along said passage in response to pressure changes on either side thereof, said liquid being capable of wetting said passage, and volume-changing structure for varying the pressure within said chamber until it is equal to the atmospheric pressure on the opposite side of said air seal.

3. A barometer for measuring changes in atmospheric pressure comprising a normally sealed chamber, a flow channel open at one end to atmosphere and connected to said chamber at its opposite end, a small quantity of liquid disposed in said channel to form a movable air seal therefor and movable along said channel in response to pressure changes on either side thereof, means for varying the pressure within said chamber until it is equal to the atmospheric pressure on the opposite side of said air seal, means for indicating the location of said seal in said channel, and means for determining from operation of said pressure-varying means said pressure on said opposite side of said seal.

4. A barometer for measuring changes in atmospheric pressure comprising a normally sealed chamber, a transparent flow channel open at one end to atmosphere and connected to said chamber at its opposite end, visible means disposed in said channel to form an air seal therefor and movable in response to pressure changes on either side thereof, and displaceable means for varying the volume of said chamber until the pressure therein is equal to that of the atmosphere on the opposite side of said air seal.

5. A barometer for measuring changes in atmospheric pressure comprising a normally sealed chamber, a horizontal transparent flow channel open at one end to the atmosphere and connected to said chamber at its opposite end, a small quantity of a non-volatile liquid disposed in said channel to form a movable and visible air seal therefor and movable along said channel in response to pressure changes on either side thereof, displaceable means for varying the volume of said chamber until the pressure therein is equal to that on the opposite side of said air seal, and means for determining the extent of the displacement of said volume-changing means whereby the atmospheric pressure on the opposite side of said air seal may be determined.

6. A barometer for measuring changes in pressure of the atmosphere comprising a chamber, means including a flow channel with a drop of a non-volatile liquid visible through said channel and disposed therein for sealing said chamber, said flow channel communicating at one end with said chamber and at the opposite end with the atmosphere, said flow channel having liquid traps spaced one from the other to limit movement of said liquid drop to the region therebetween, displaceable means disposed within said chamber for changing the volume thereof to control the position between said traps of said liquid drop, and means for determining from the displacement of said means the atmospheric pressure.

7. A barometer comprising a normally sealed chamber and a normally unsealed chamber open to the atmosphere through a restricted opening, a transparent flow channel interconnecting said chambers, a liquid air seal movable along and visible through said flow channel in response to pressure differences between said chambers, and displaceable means for varying the volume of said sealed chamber until the pressure therein equals that of the atmosphere in said unsealed chamber, said restricted opening and unsealed chamber serving to smooth out transient changes in atmospheric pressure.

8. An atmospheric pressure-measuring instrument of the null type comprising a pair of chambers, one of which is normally sealed, a horizontal, transparent flow channel interconnecting said chambers, an air seal disposed therein comprising a small quantity of a non-volatile liquid, valve means for opening the other chamber to atmosphere, a resulting change in pressure within said other chamber, having the effect of moving said air seal toward the chamber having the lower pressure, displaceable means for changing the volume of, and the pressure within the other normally sealed chamber to return said air seal to its original position, and means for determining the change in pressure which occurred in said normally sealed chamber from the extent of displacement of said means in the other of said chambers.

9. A pressure-measuring instrument comprising a normally sealed chamber and a second chamber subject to the gas pressure to be measured, a transparent flow channel interconnecting said chambers, a liquid seal movable along said flow channel in response to pressure differences between said chambers, displaceable means for varying the volume of said sealed chamber until the pressure therein equals that in said second chamber, and filtering means comprising said second chamber and an opening therefor of such a small size that there is formed a filter for substantially eliminating any effect on said seal of rapidly varying changes in the gas pressure applied to said second chamber.

10. A pressure-measuring instrument comprising a pair of chambers, one of which is normally sealed, tubing interconnecting said chambers, at least a portion of said tubing being transparent, a liquid globule disposed within said transparent portion and movable in response to pressure differences between said chambers, an expansible bellows having one end connected to a wall of said normally sealed chamber and having its opposite end sealed, a rod extending into the interior of said bellows, a bearing disposed within said bellows for said rod, means for moving said rod longitudinally of said bellows to expand or contract it, said last-named means comprising a rotatable gear and a splined shaft slidable lengthwise thereof, said rod being threaded, a threaded stationary member cooperating with said rod for producing lengthwise movement thereof upon rotation of said gear, and means for measuring the amount of rotation of said rotatable gear whereby the extent of elongation or contraction of said bellows may be determined.

11. A pressure-measuring instrument comprising a normally sealed inner chamber and an outer chamber, a transparent flow channel interconnecting said chambers, a liquid air seal movable along said flow channel in response to pressure differences between said chambers, valve means in said flow channel and movable from an open position to a closed position to clamp or lock said air seal in position, and displaceable means operable when said valve is open for varying the volume of said inner chamber until the pressure therein equals that in said outer chamber.

12. A pressure-measuring instrument comprising a normally sealed inner chamber and an outer chamber, a transparent flow channel interconnecting said chambers, a liquid air seal movable along said flow channel in response to pressure differences between said chambers, displaceable means for varying the volume of said inner chamber until the pressure therein equals that in said outer chamber, and valve means for controlling application of fluid pressures to each of said chambers.

13. A pressure-measuring instrument comprising a normally sealed inner chamber and an outer chamber within which said inner chamber is disposed, capillary tubing interconnecting said chambers, said tubing having a transparent horizontal section, a liquid air seal movable along said horizontal section in response to pressure differences between said chambers, displaceable means disposed within said inner chamber for varying the volume thereof to equalize the pressure with that of said outer chamber, means operable in spaced relation with both of said chambers for actuating said displaceable means, and valve means for connecting said outer chamber to an atmosphere the pressure of which is to be measured.

14. A pressure-measuring instrument comprising an outer chamber, an inner chamber disposed within said outer chamber, said chambers having a common closure member, volume-changing means supported from said closure member for varying the volume of one of said chambers, capillary tubing interconnecting said chambers, said tubing including a transparent horizontal section intermediate the ends thereof and with liquid traps at each end of said horizontal section, a liquid air seal disposed within said horizontal section and movable from one to the other of said liquid traps in response to a difference in pressure between said chambers, means extending through said closure member for operating said displaceable means, and means for accurately determining the position of said liquid air seal in response to changes of pressure produced by operation of said displaceable means.

15. A barometric pressure-measuring instrument comprising walls forming an outer chamber normally open to atmosphere and an inner chamber disposed therein, said chambers having a common closure member for corresponding ends thereof, an expansible bellows secured at one end to said closure member, the opposite end thereof being closed, means disposed within said bellows for expanding and contracting said bellows to vary the volume of said inner chamber, tubing of relatively small size interconnecting said chambers, said tubing having a normally horizontal transparent section, a liquid air seal disposed therein and movable in response to a difference in pressure between the said two chambers, viewing means for observing the position of said air seal within said horizontal section, a change in pressure in one of said chambers causing said air seal to move a distance such that the volume change of one chamber equalizes the pressure change in the other chamber, and means for actuating said means for expanding or contracting said bellows until said air seal is returned to its original position.

16. An instrument for measuring gas pressure comprising an outer chamber in communication with a source of pressure to be measured, an inner chamber, a closure member common to both said chambers, an expansible bellows carried by said closure member and extending inwardly into one of said chambers, means including a heat-insulated rod for expanding and contracting said bellows to change the volume of the chamber in which it is disposed, capillary tubing interconnecting said chambers, said tubing having a normally horizontal transparent section, a small quantity of liquid disposed within said tubing to form a movable air seal therein, walls of heat-insulating material enclosing said outer chamber, and means operable externally of said heat-insulated walls for expanding and contracting said bellows to equalize the pressure existing on each side of said liquid seal.

17. A barometric pressure-measuring instrument of the null type comprising a pair of chambers one disposed within the other, a wall forming a common closure member for both chambers, volume-changing means supported from said closure member and extending inwardly into one of said chambers, means including said volume-changing means for sealing the chamber, means operable externally of said chamber for actuating said volume-changing means, transparent capillary tubing interconnecting said chambers, said tubing having an elongated normally horizontal section, a liquid seal disposed in said horizontal section and movable therein in response to changes in pressure as between said inner and outer chambers, valve means connecting said outer chamber to the atmosphere, a viewing tube for precisely determining the location of said liquid seal within said tubing, and means for illuminating said liquid seal through said tube.

18. A pressure-measuring instrument comprising a normally sealed chamber, a transparent flow channel connected at one end to and extending from said chamber, a second chamber connected to the other end of said flow channel and connected to the gaseous atmosphere whose pressure is to be measured, a liquid seal within and movable along said flow channel in response to pressure differences between said chambers, and displaceable volume-changing structure for varying the volume of the sealed chamber whereby said liquid seal may be displaced to a desired position and the volume change of the sealed chamber necessary to effect the required displacement determined.

19. A pressure-measuring instrument comprising a normally sealed chamber, a transparent flow channel of uniform internal diameter connected at one end to and extending from said chamber, a second chamber connected to the other end of said flow channel and connected to the gaseous atmosphere whose pressure is to be measured, a liquid seal within and movable along said flow channel in response to pressure differences between said chambers, valve means normally open when the instrument is in use between said second chamber and the atmosphere whose pressure is to be measured, closure of said valve means preventing excessive displacement of the liquid seal due to a large difference in pressure between said chambers, and means including volume-changing structure for varying the volume of said sealed chamber thereby to change its pressure, whereby said liquid seal may be displaced to a desired position along said flow channel and the volume change of the sealed chamber necessary to effect the required displacement determined.

GEORGE E. CONOVER.

REFERENCES CITED

The following references are of record in the file of this patent:

UNITED STATES PATENTS

| Number | Name | Date |
|---|---|---|
| 622,761 | Densmore et al. | Apr. 11, 1899 |
| 1,100,171 | Brown | June 16, 1914 |
| 1,643,469 | Reeves | Sept. 27, 1927 |
| 1,945,203 | Schiske | Jan. 30, 1934 |
| 2,107,595 | Bourdon | Feb. 8, 1938 |
| 2,116,636 | Neumann | May 10, 1938 |
| 2,303,111 | Cuyler et al. | Nov. 24, 1942 |
| 2,434,837 | Cornett | Jan. 20, 1948 |

FOREIGN PATENTS

| Number | Country | Date |
|---|---|---|
| 28,625 | Great Britain | Dec. 19, 1911 |
| 154,028 | Great Britain | Nov. 25, 1920 |